Patented Mar. 20, 1923.

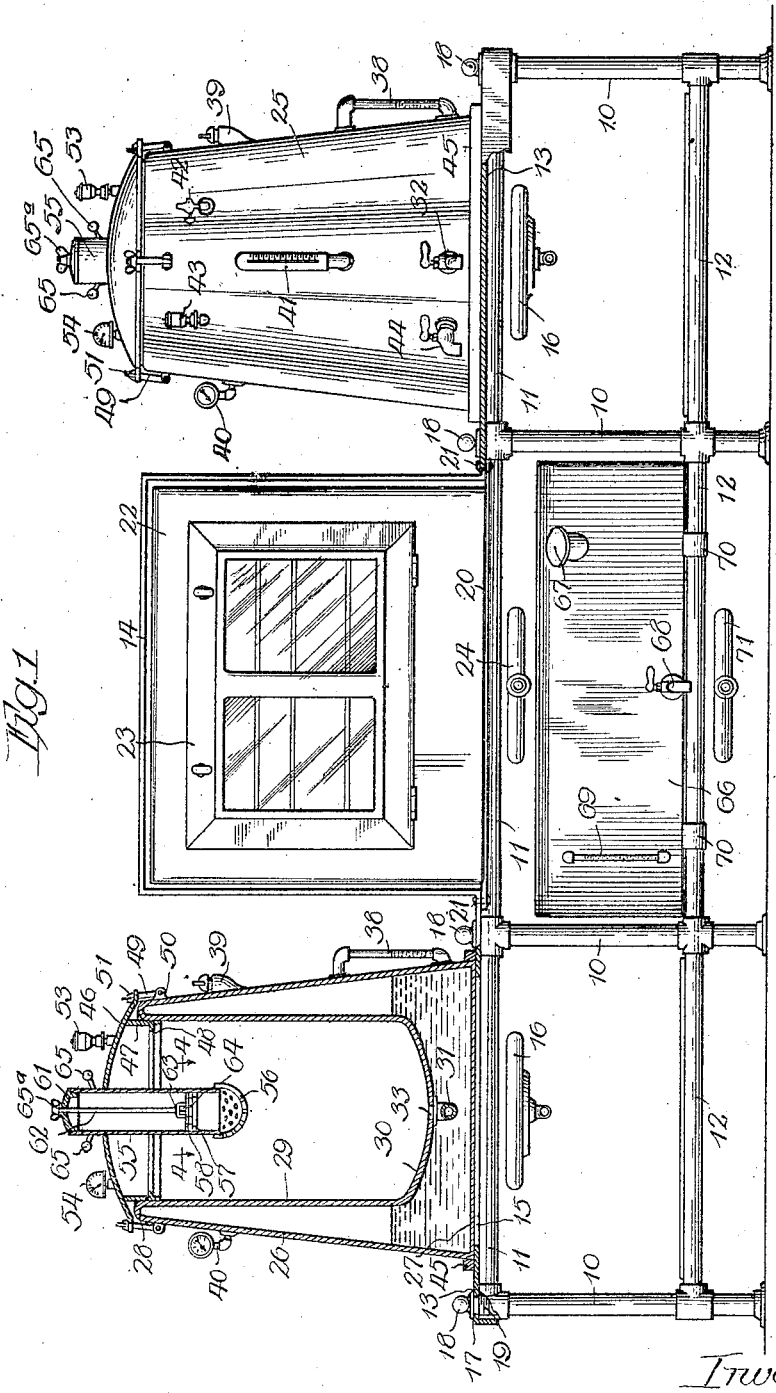

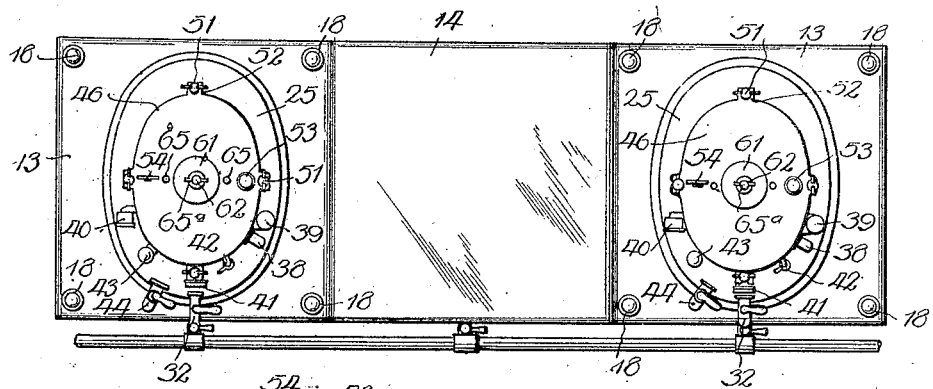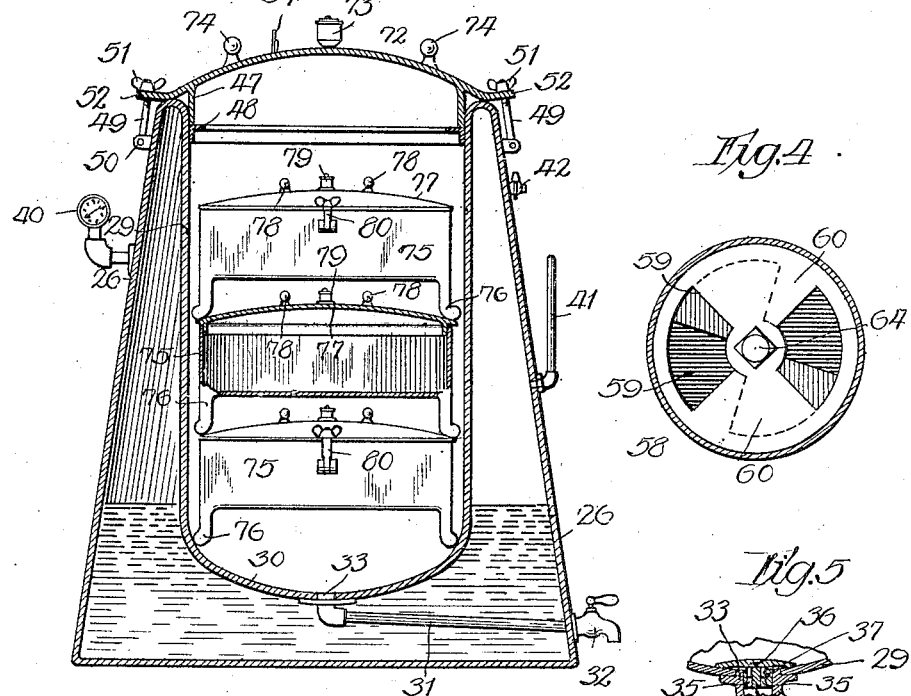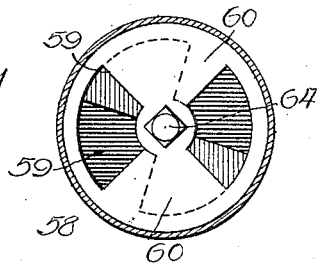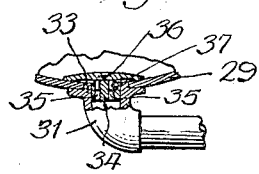

1,448,916

UNITED STATES PATENT OFFICE.

ALFRED M. DEMUTH, OF CHICAGO, ILLINOIS, ASSIGNOR TO DEMUTH MANUFACTURING COMPANY, OF CHICAGO, ILLINOIS, A CORPORATION OF ILLINOIS.

COOKING APPARATUS.

Application filed July 26, 1920. Serial No. 399,125.

*To all whom it may concern:*

Be it known that I, ALFRED M. DEMUTH, a citizen of the United States, residing at Chicago, in the county of Cook and State of Illinois, have invented certain new and useful Improvements in Cooking Apparatus, of which the following is a specification.

This invention relates to improvements in cooking apparatus of the type whereby several cooking operations, such as pressure cooking of articles of food in their own juices and a baking operation may be simultaneously carried on, or one may be performed independent of the other, and one of the objects of the invention is to improve and simplify the construction of such an apparatus whereby the cost of manufacture is materially reduced, with the result that a simple, cheap, compact, and convenient apparatus will be produced, and which will also be adapted to all of the uses to which an ordinary stove may be put.

A further object is to provide an improved form of basting apparatus.

To the attainment of these ends, and the accomplishment of other new and useful objects as will appear, the invention consists in the features of novelty in substantially the construction, combination and arrangement of the several parts hereinafter more fully described and claimed and shown in the accompanying drawings illustrating this invention and in which—

Figure 1 is a view partly in side elevation, partly in section, partly broken away and with parts omitted.

Figure 2 is a top plan view of Figure 1.

Figure 3 is an enlarged view partly in vertical section and partly in side elevation showing a modified arrangement of the apparatus.

Figure 4 is a detail sectional view taken on line 4—4 Figure 1.

Figure 5 is an enlarged sectional view of a detail.

In the drawing there is shown a suitable supporting structure for the apparatus and which supporting structure preferably embodies a series of uprights 10 connected at their upper ends by means of tubular elements 11, and additional tubular elements 12 may be provided between the uprights adjacent their lower ends.

These parts are preferably detachably secured together so that the supporting structure may be collapsed or knocked down for transportation purposes.

The uprights 10 are preferably tubular and their upper extremities are provided with internal screw threads for a purpose to be hereinafter set forth.

Resting upon the supporting structure thus formed is a top member 13 which is constructed of a single piece of sheet material such as metal. This element 13 is shaped so as to form an upstanding central portion 14 intermediate the ends of the element and the portion of the element on each side of the upstanding portion 14 is provided with openings 15 through which the products of combustion of burners 16 arranged below the openings are adapted to pass. This element 13 is provided with a series of openings 17 one adjacent each of the uprights 10 and these openings 17 register with the openings in the uprights 10 so that knobs 18 having screw thread extremities 19 may be passed through the openings 17 so as to engage the threads in the upper ends of the upright 10 for securing the element 13 to the supporting structure. The supporting structure and the element 13 may be of any desired length and width and the upstanding portion 14 may project above the supporting structure to any desired extent and may be of any desired configuration. A base member 20 is provided which extends across the opening at the bottom of the upstanding portion 14 to form a chamber and this base member 20 may be secured in position in any suitable manner such as by means of bolts or rivets 21, or may be spot welded. Within the chamber thus formed by the upstanding portion 14 and the base 20 is arranged a suitable oven 22 of any desired construction and this oven is provided with the usual door 23.

A burner 24 is provided below the oven for the purpose of supplying heat to the oven.

Arranged on each side of the oven thus formed and disposed above the respective openings 15 in the element 13 are cookers designated generally by the reference numeral 25 at the right of Figure 1. These cookers may be of any desired configuration and of any desired size but are preferably oval in cross section and the outer casing 26 is preferably of a form to taper from the bottom 27 thereof to the top 28.

Arranged within the outer casing 26 is a cooking compartment 29 which projects for any desired extent into the outer casing and terminates short of the bottom thereof. The walls of this compartment 29 are preferably straight so as to form a space between the outer casing and the inner compartment and the bottom of the inner compartment is preferably rounded as at 30, and leading from the central portion of the bottom is a draw-off pipe 31 which extends through the outer wall 27 of the cooker and terminates in a cock or faucet 32 so that the liquid contents of the compartment 29 may be readily withdrawn therefrom when desired by means of the faucet 32.

If desired there may be provided in the opening 33 a strainer plug 34 which is provided with any desired number of openings 35. With cooking articles which do not contain a large quantity of moisture it may be desirable to close the outlet opening 33 and in that event there may be provided a cap or closure 36 having a series of depending pins 37 and which cap is adapted to be placed over the outlet 36 so that the pins 37 will enter the respective openings 35.

If desired there may be provided a water gauge 38 for the cooking apparatus to indicate the amount of water in the outer casing and also fill opening 39 suitably arranged. A pressure gauge 40 may also be provided to indicate the pressure within the outer casing. A thermometer 41 may be provided for indicating the temperature, while a pet cock 42 is employed for the purpose of allowing the air within the outer casing 26 to escape while the pressure is being raised in the casing, and an automatic blow-off or safety device 43 may also be provided so as to prevent the pressure within the outer casing from increasing beyond the desired extent. A draw-off cock 44 may be arranged at the lower end of the outer casing for removing the water therefrom as occasion may require.

This casing thus constructed is adapted to be placed upon the top of the supporting structure so as to stand over the opening 15, one of the cookers being provided for each of the openings 15, and in order to position the cooker over the opening a circumferential flange 45 may be provided surrounding the opening.

It will thus be seen that when desired the cooker may be placed in position and when the burner 16 is lighted, the water in the outer casing will become heated to generate steam and when the pressure has risen to a predetermined degree, any increase in the pressure will operate to actuate the automatic blow-off 43 which latter serves as a safety device.

If it is desired to use the burner 16 for other purposes than with the cooker 25 the cooker may be readily removed and another and different form of cooking operation may be performed over the burner 16.

A concaved cover 46 is provided for the cooker. This cover is preferably provided with a depending flange 47 which is adapted to project into the upper part of the compartment 29 to engage and rest upon a circumferential flange or shoulder 48 within the compartment and the cover is held in position preferably by means of fastening bolts 49 which are pivotally connected as at 50 with the outer wall 26 of the cooker 25 and has adjustably connected to the free end thereof a thumb nut 51 which latter is adapted to engage ears or bifurcated portions 52 formed on the cover so that when the thumb nuts 51 are screwed down upon the bolts 49 the compartment 29 will be hermetically sealed.

An automatic blow-off 53 may be provided on the cover 46 which acts as a safety device when the pressure in the compartment increases beyond a predetermined degree.

A dial or indicator 54 may also be connected with the cover 46 and is adapted to be set to indicate the time in which the contents of the compartment 29 should be removed therefrom, to assist the operator in the cooking operation.

In order that the contents of the compartment 29 may be basted when desired there may be provided a basting apparatus which embodies a tubular body portion 55 of any desired size and configuration. This portion 55 is tubular and is open at both ends, the lower end being covered by a reticulated element 56. The body portion 55 is projected through a suitable opening in the cover 46 so that one end will project into the compartment 29 and the other end will project above the cover for any desired extent, the element 55 being secured to the cover 46 in any suitable manner. Within the body 55 supported preferably by means of an annular shoulder 57 are co-operating cut-offs 58 one arranged above the other and each being provided with openings 59 therethrough and imperforate portions 60 intermediate the openings 59. These elements 58 are adapted to be rotated one with respect to the other so as to cause the openings 59 therethrough to be brought into register or out of register and when the openings register with each other the liquid contents of the tubular body 55 above the cut-offs will be delivered through the openings 59 on to the reticulated element 56 and through which latter element the liquid will drip on to the contents of the compartment 29. A cover 61 is provided for the tubular body 55 and through this cover 61 an operating stem 62 passes. The stem is provided with a seat 63 at its lower end which is adapted to pass over an angular projection 64 on one of the elements 58, so that when the stem 62 is rotated by means of the handle 65a, which latter may be in the form of a thumb nut, one of the elements 58 will be rotated with respect to the other to open and close the openings 59.

When it is desired to baste the contents of the receptacle the juices are drawn through the draw-off pipe 31. The cover 61 is removed from the tubular element 55 and with it the stem 62, it of course being understood that the elements 58 have been rotated one with respect to the other to close the openings 59 before the cover 61 is removed. The juices which have thus been withdrawn are then emptied into the tubular element 55 above the cut-offs 58. The cover 61 is then placed in position and with it the stem 62, after which the stem 62 is rotated and the openings 59 brought into register to any desired extent to deliver the liquids to the reticulated element 56.

Handles 65 may be provided and are preferably connected with the projecting portion of the tubular element 55 so that the cover 46 may be removed when the fastening bolts 49 are detached from the cover.

Arranged within the supporting structure and preferably between adjacent uprights 10 is a water tank 66 having a fill opening 67, a draw-off cock 68 and water gauge 69. This tank may be supported and secured in position in any suitable manner but preferably rests upon cross members 70 connected with the lower connecting member 12 and the tank is of such a height that it will not interfere with the burner 24. A burner 71 is provided and is supported in any suitable manner beneath the tank 66 so as to heat the contents thereof.

If desired and in order to cook several different articles of a different nature within the compartment 29 the cover 46 and basting apparatus 55 may be removed and in lieu of the cover 46 another cover 72 may be provided, which is of a similar construction to the cover 46, with the exception that the basting apparatus 55 is omitted therefrom and the cover 72 is closed with the exception of an opening over which a safety or blow-off device 73 is arranged, and this cover 72 may be removed or placed in position by means of suitable handles 74.

A plurality of individual containers 75 having legs 76 are provided for this cooking operation. Each of the containers 75 is provided with a cover 77 which is preferably of a concave formation having handles 78 and a safety blow-off device 79. These covers 77 are secured in position by means of suitable fastening bolts 80 similar to the bolts 49 so that the covers may be secured in position and the containers 75 hermetically sealed.

These containers are superposed one upon the other within the compartment 29 and the cover 72 is then secured in position.

With this form of the invention it will be manifest that the aroma from one of the containers 75 will not affect the food or articles contained within and being cooked in any of the other containers 75.

With this improved construction it will also be manifest that there will be produced an apparatus which will be of an extremely simple and light construction, inexpensive to manufacture and which may be readily installed and at the same time there will be provided an apparatus which may be adapted to all of the uses to which an ordinary stove may be put.

While the preferred form of the invention has herein been shown and described, it is to be understood that various changes may be made in the details of construction and in the combination and arrangement of the several parts within the scope of the claims without departing from the spirit of this invention.

What is claimed as new is:

1. A cooking apparatus embodying a supporting structure, an element constructed of sheet material extending across and resting upon the said structure, fastening devices passing through the said element and engaging the said structure, a portion of the said element intermediate its ends being shaped to form a compartment, a portion of the said element at the base of the compartment being flat and extending for a considerable distance beyond the compartment and having an opening therethrough, said opening being of a considerable diameter, a cooking vessel removably resting upon said flat portion of the said element over the last said opening, and burners disposed below the said compartment and vessel.

2. A cooking apparatus embodying a supporting structure, an element constructed of sheet material extending across and resting upon the said structure, fastening devices passing through the said element and engaging the said structure, a portion of the said element intermediate its ends being shaped to form a compartment and on opposite sides thereof being flat and extending for a considerable distance beyond the compartment and having openings therethrough on the opposite sides of the compartment, said openings being of a considerable diameter, cooking vessels removably resting upon said flat portion of the said element over the last said openings, and burners disposed below the said compartment and vessels.

3. A cooking apparatus embodying a supporting frame, said frame embodying uprights having open upper ends, an element constructed of a single piece of sheet material resting upon and extending across the said frame, said element having apertures adapted to register with the open ends of the uprights, fastening devices passing through the openings and being removably seated in the ends of the uprights, a portion of said element being shaped to form an oven compartment projecting above the remaining portion of the element, the last recited portion of the element being flat and having an enlarged opening therethrough, a burner beneath the last recited opening, and a burner below the oven compartment.

4. A cooking apparatus embodying a supporting frame, said frame embodying uprights having open upper ends, an element constructed of a single piece of sheet material resting upon and extending across the said frame, said element having apertures adapted to register with the open ends of the uprights, fastening devices passing through the openings and being removably seated in the ends of the uprights, a portion of said element being shaped to form an oven compartment projecting above the remaining portion of the element, the last recited portion of the element being flat and having an enlarged opening therethrough, a burner beneath the last recited opening, a burner below the oven compartment, a water tank supported by the frame and disposed below the first recited element, and a burner disposed below the said tank.

In testimony whereof I have signed my name to this specification, on this 2nd day of July, A. D. 1920.

ALFRED M. DEMUTH.